United States Patent
Osaka

(10) Patent No.: US 7,761,907 B2
(45) Date of Patent: Jul. 20, 2010

(54) IMAGE-FORMING DEVICE, METHOD FOR CONTROLLING IMAGE-FORMING DEVICE, TERMINAL, METHOD FOR CONTROLLING TERMINAL, AND COMPUTER PROGRAM

(75) Inventor: Hitoshi Osaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 11/146,960

(22) Filed: Jun. 7, 2005

(65) Prior Publication Data

US 2006/0020805 A1 Jan. 26, 2006

(30) Foreign Application Priority Data

Jun. 8, 2004 (JP) .............................. 2004-170227
May 20, 2005 (JP) .............................. 2005-148537

(51) Int. Cl.
*G06F 21/04* (2006.01)
*G06F 21/22* (2006.01)

(52) U.S. Cl. ..................... 726/4; 726/3; 726/5; 726/7; 713/176; 713/182

(58) Field of Classification Search ................ 380/51, 380/55, 234; 726/3–7, 34–35, 28, 281; 713/200–202, 713/176, 182; 720/610; 270/52.01; 358/1.1–1.18, 358/500–540, 296–305, 400–498
See application file for complete search history.

(56) References Cited

U.S. PATENT DOCUMENTS 5,077,795 A * 12/1991 Rourke et al. ................. 380/55
6,711,677 B1 * 3/2004 Wiegley ...................... 713/151
2005/0088679 A1 * 4/2005 Martin et al. ............... 358/1.14
2005/0097347 A1 * 5/2005 Josephsen et al. ........... 713/200
2005/0168766 A1 * 8/2005 Troyansky et al. ......... 358/1.14

FOREIGN PATENT DOCUMENTS

| JP | 2003-084962 A | 3/2003 |
| JP | 2004-053718 A | 2/2004 |
| JP | 2004338295 A * | 12/2004 |

OTHER PUBLICATIONS

JP 2004-338295 A (Hirama Junko) Dec. 2, 2004 (computer-generated translation into English). [online] [retrieved on Nov. 17, 2009]. Retrieved from: Patent Abstracts of Japan Database.*

* cited by examiner

*Primary Examiner*—Taghi T Arani
*Assistant Examiner*—Justin T Darrow
(74) *Attorney, Agent, or Firm*—Canon USA Inc IP Division

(57) ABSTRACT

An image-forming device comprises an identifier-storage unit for storing an identifier in correlation with one of a plurality of feeding units on which at least one sheet used for image-forming processing is loaded, a specification unit for specifying the feeding unit by using the identifier, and a usability-determination unit for determining whether use of the specified feeding unit is permitted, where the image-forming device forms an image by feeding the sheet from the specified feeding unit based on the determination result made by the usability-determination unit.

5 Claims, 11 Drawing Sheets

40
- BASIC I/O PROGRAM — 41
- OS — 42
- CONTROL PROGRAM — 43
- DATA AREA M1 — 44
- WORK AREA — 45
  - W1
  - W2
  - ⋮

500 https://168.0.0.1/  —502

PRINTER-SETTING SCREEN

CASSETTE-NAME SETTINGS   504  506

CASSETTE 1 [WATERMARKED SHEET A]  ☑ ENCRYPTION
CASSETTE 2 [OHP SHEET]            ☐ ENCRYPTION
CASSETTE 3 [          ]            ☐ ENCRYPTION
MANUAL FEEDING [          ]        ☐ ENCRYPTION

CASSETTE-NAME SETTINGS
LAYOUT SETTINGS
JOB MANAGEMENT

508 — (SET)

FEEDING-CASSETTE SETTING

CASSETTE NAME  [ ▼ ]   (LOG IN TO PRINTER)
                            602

(OK)  (CANCEL)

FIG. 7

LOG IN TO PRINTER

PRINTER  [Printer AAA ▼]   Login    [Admin]
         Printer BBB        Password [********]
         Printer CCC (OK)  (CANCEL)

IMAGE-FORMING DEVICE, METHOD FOR CONTROLLING IMAGE-FORMING DEVICE, TERMINAL, METHOD FOR CONTROLLING TERMINAL, AND COMPUTER PROGRAM

BACKGROUND OF THE INVENTION

1. Field of the Invention

The present invention relates to an image-forming device and a terminal, and particularly relates to a method for restricting use of a predetermined feeding cassette of the image-forming device.

2. Description of the Related Art

Currently, where printing is performed using forms or the like by a known image-forming device, such as a known printer, a sheet used for the printing often has a special value. For example, the sheet may have a preprint pattern thereon, so as to assure the value of a printed matter obtained by the printing, or the sheet may be watermarked, so as to assure the originality of the printed matter.

The sheet having the special value may be a receipt printed on a special sheet, or a certificate document that is issued by a public office and that is printed on the special sheet, for example. Although it is difficult to replicate the sheet, it is easy to falsify information that is printed on the sheet, where the information includes, for example, characters and rules. Therefore, once the special sheet is obtained, the above-described receipt and certificate document can be easily replicated.

In the past, the above-described special sheet including a pre-printed sheet, a watermarked sheet, and so forth was often placed in a predetermined sheet cassette of the image-forming device. If a user wanted to use the special sheet, the user explicitly specified the sheet cassette in which the special sheet is placed as a feeding source, and performed printing. However, there has always been a danger that a printed matter having a special value and/or meaning may be replicated with ease, once the special sheet is obtained and used.

Japanese Patent Laid-Open No. 5-169745, Japanese Patent Laid-Open No. 7-144822, and Japanese Patent Laid-Open No. 9-220842 have proposed protecting a printed matter from theft by locking a discharge bin. However, these methods are ineffective for a person who issues a print request for an unauthorized purpose.

Accordingly, a function of controlling an access to a predetermined feeding cassette during printing has been needed. For achieving the above-described function, predetermined conditions for specifying the predetermined feeding cassette must be precisely set up, at the time where a function of specifying one of feeding cassettes of the image-forming device and performing printing is provided.

It is essential that the user not be able to perform printing by specifying the feeding cassette via predetermined print software.

Further, if the above-described conditions are met, feeding from the predetermined feeding cassette and printing by using a sheet placed therein should be allowed. Further, access to the predetermined feeding cassette should be physically restricted so that the user cannot take a sheet out of the predetermined feeding cassette.

SUMMARY OF THE INVENTION

Accordingly, the present invention allows controlling access to a predetermined feeding cassette for printing.

The present invention provides an image-forming device including an identifier-storage unit configured to store an identifier in correlation with each of a plurality of feeding units on which at least one sheet used for image-forming processing is loaded, a specification unit configured to specify the feeding unit by using the identifier, a usability-determination unit configured to determine whether use of the specified feeding unit is permitted, and an image-forming unit configured to feed the sheet from the specified feeding unit and performing printing by using the fed sheet based on the results of the determination made by the usability-determination unit.

For example, the identifier-storing unit can assign a first password to each of the feeding units and store the first passwords in correlation with the feeding units. The image-forming device can further include a password-reception unit configured to receive a second password transmitted from an external device. The usability-determination unit can determine whether the first password assigned to the specified feeding unit is necessary. Where it is determined that the first password is necessary, the usability-determination unit can check the first password corresponding to the specified feeding unit against the second password and determine whether the specified feeding unit is usable based on the check result.

In another aspect, the image-forming device can further include a transmission unit configured to transmit information about at least one of the feeding units according to at least one request transmitted from the external device and an identifier-reception unit configured to receive the identifier that is correlated with the feeding unit and that is transmitted from the external device. The identifier-storage unit can store the identifier received by the identifier-reception unit in correlation with the feeding unit.

In still another aspect, the image-forming device can further include an identifier-encryption unit configured to encrypt at least one of the identifiers stored in the identifier-storage unit.

Here, for example, the identifier-encryption unit can encrypt the identifier corresponding to at least one of the plurality of feeding units based on encryption-request information, where the encryption request information is transmitted with the identifier to the identifier-reception unit.

In still yet another aspect, the image-forming device can further include a locking unit configured to physically lock at least one of the plurality of feeding units.

The present invention provides a terminal including a communication unit configured to communicate with at least one image-forming device, an identifier-acquisition unit configured to acquire a predetermined identifier of at least one feeding unit of the image-forming device via the communication unit, a feeding-unit setting unit configured to set a desired feeding unit according to the identifier acquired by the identifier-acquisition unit, and an identifier-transmission unit configured to transmit the identifier corresponding to the feeding unit set by the feeding-unit setting unit to the image-forming device via the communication unit.

Here, for example, the identifier-acquisition unit can acquire at least one encrypted identifier and at least one non-encrypted identifier and produce a display image of the feeding unit and the identifier thereof on a display unit based on the non-encrypted identifier. The identifier-transmission unit can transmit the encrypted identifier corresponding to the feeding unit set by the feeding-unit setting unit.

In another aspect, the terminal can further include a password-transmission unit configured to set a predetermined identifier and a predetermined password corresponding to the feeding unit and transmitting the predetermined identifier and the predetermined password to the image-forming device via the communication unit. The identifier-transmission unit can transmit the password corresponding to the feeding unit set by the feeding-unit setting unit.

Here, for example, the identifier-transmission unit can transmit the identifier and the password with print data whose image is formed by the image-forming device.

In yet another aspect, the terminal can further include a display unit configured to provide at least one user interface for encouraging password supply, where a request for password supply is transmitted from the image-forming device via the communication unit.

The present invention provides a method for controlling an image-forming device. The method includes storing a predetermined identifier in correlation with one of a plurality of feeding units on which at least one sheet used for image-forming processing is loaded, specifying at least one of the feeding units by using the identifier, determining whether use of the specified feeding unit is permitted, and forming at least one image by feeding the sheet from the specified feeding unit and performing printing based on the results of the determination.

The present invention provides a method for controlling a terminal. The method includes acquiring a predetermined identifier of at least one feeding unit of an image-forming device, setting a desired feeding unit based on the acquired identifier, and transmitting the identifier corresponding to the set feeding unit to the image-forming device.

The present invention provides a computer program for carrying out a method for controlling an image-forming device. The method includes storing a predetermined identifier in correlation with one of a plurality of feeding units on which at least one sheet used for image-forming processing is loaded, specifying at least one of the feeding units by using the identifier, determining whether use of the specified feeding unit is permitted, and forming at least one image by feeding the sheet from the specified feeding unit and performing printing based on the results of the determination.

The present invention provides a computer program for carrying out a method for controlling a terminal. The method includes acquiring a predetermined identifier of at least one feeding unit of an image-forming device, setting a desired feeding unit based on the acquired identifier, and transmitting the identifier corresponding to the set feeding unit to the image-forming device.

Further features and advantages of the present invention will become apparent from the following description of exemplary embodiments with reference to the attached drawings.

BRIEF DESCRIPTION OF THE DRAWINGS

FIG. 5 shows an example information-setting page of an image-forming device according to the first embodiment of the present invention.

FIG. 6 shows an example feeding-cassette setting screen according to the first embodiment of the present invention, where the feeding-cassette setting screen is provided for performing printing for a form.

FIG. 7 shows an example image-forming-device log-in screen according to the first embodiment of the present invention, where the image-forming-device log-in screen is provided for setting a feeding cassette and performing printing for the form.

DESCRIPTION OF THE EMBODIMENTS

First Embodiment

Next, embodiments of the present invention will be described in detail with reference to the attached drawings.

Figure 17:
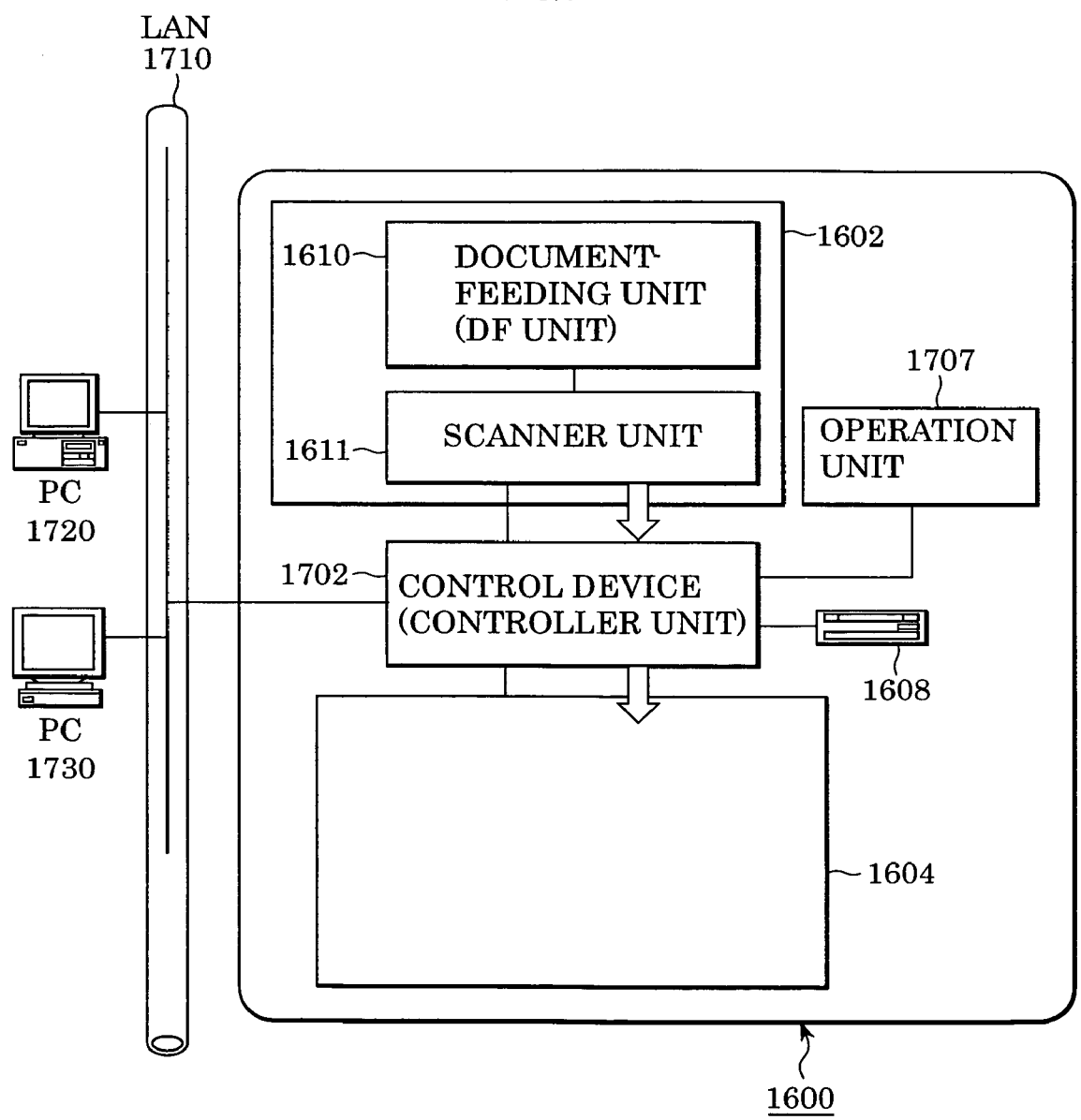
FIG. 17 shows the schematic configuration of the image-forming device and client terminals according to the first embodiment of the present invention.

FIG. 17 is a block diagram showing an example of the image-forming device of the present invention, where the provided image-forming device is a printer. An image input-and-output device 1600 is connected to computers 1720 and 1730 that are client terminals via a local area network (LAN) 1710 such as Ethernet®.

The image-forming device includes a reader unit 1602 for reading image data, a printer unit 1604 for outputting the image data, an operation unit 1707 having keys used for inputting and outputting the image data, a liquid-crystal touch panel for producing display images of image data and/or various functions (not shown), and a hard disk 1608 with a control program, image data, and so forth that were stored therein in advance. The reader unit 1602 includes a document feeding unit 1610 and a scanner unit 1611. The image-forming device further includes a controller unit 1702 that is connected to the above-described elements and that controls the above-described elements.

The controller unit 1702 functions as a scanner for converting the image data read by the reader unit 1602 into code data and transmitting the code data to the computers 1720 and 1730 and/or other terminals (not shown) on the LAN 1710 via the LAN 1710. The controller unit 1702 also functions as a printer for converting the code data transmitted from the computers 1720 and 1730, and other terminals (not shown) via the LAN 1710 into image data and transmitting the image data to the printer unit 1604. The controller unit 1702 includes other functional blocks (not shown).

Figure 16:
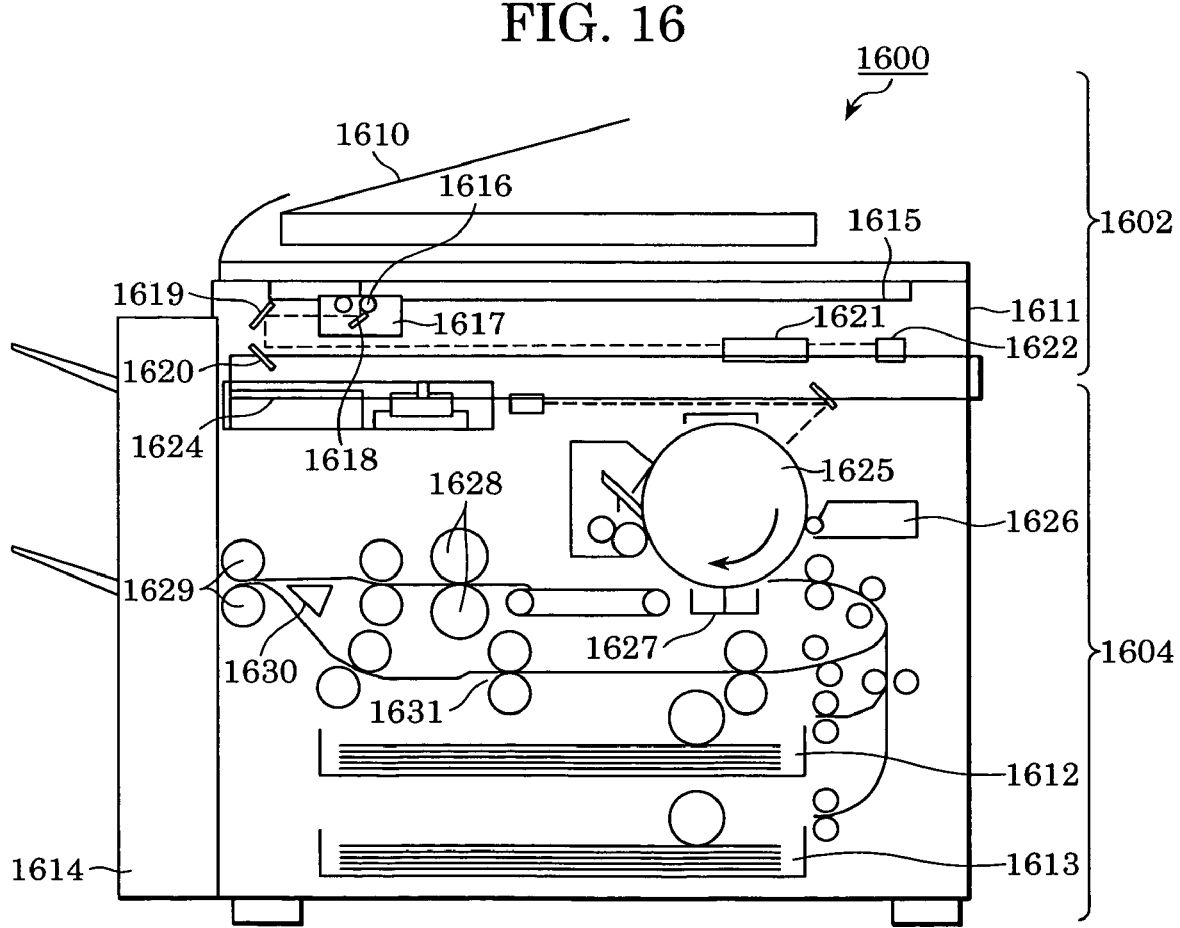
FIG. 16 shows the schematic configuration of the image-forming device according to the first embodiment of the present invention.

FIG. 16 illustrates an internal configuration of the image-forming device 1600, so as to show the details of the reader unit 1602 and the printer unit 1604. The reader unit 1602 is mounted on the printer unit 1604. In the reader unit 1602, document sheets stacked on a document-feeding unit 1610 are transmitted onto a platen glass 1615 in sequence from the top on a one-by-one basis in the order in which the document sheets are laminated. After a scanner unit 1611 reads a document sheet by performing a predetermined reading operation, the read document sheet is transmitted from the platen glass 1615 and discharged to the document-feeding unit 1610.

Further, in the above-described scanner unit 1611, a document sheet is transmitted onto the platen glass 1615, and a lamp 1616 comes on. Then, an optical unit 1617 starts moving, so that the document sheet is irradiated from downward with the light of the lamp 1616 and scanned. Then, light reflected off the document sheet is led to a charge-coupled device (CCD) image sensor 1622 via a plurality of mirrors 1618, 1619, and 1620, and a lens 1621. Hereinafter, the CCD image sensor 1622 will be simply referred to as the CCD 1622. The scanned document image is read by the CCD 1622.

Then, the image data read by the CCD 1622 is subjected to predetermined processing, and transferred to the controller unit 1702 shown in FIG. 17. Otherwise, the lamp 1616 comes on, the optical unit 1617 starts moving, and the document sheet placed on the platen glass 1615 is irradiated from downward with the light of the lamp 1616 and scanned, so that the scanned document image can be read by the CCD 1622. The image data transmitted from the reader unit 1602 in the above-described manner is transmitted to the controller unit 1702.

Next, in the printer unit 1604, laser light corresponding to the image data transmitted from the controller unit 1702 is generated from a laser-light emission unit 1624 driven by a laser driver (not shown), and a photoconductive drum 1625 is irradiated with the laser light, so that an electrostatic-latent image corresponding to the laser light is generated on the photoconductive drum 1625. Further, a developer adheres to the electrostatic-latent image through a developer unit 1626.

On the other hand, upon starting the laser-light irradiation, a recording sheet is transmitted from either a feeding cassette 1612 or a feeding cassette 1613 and transferred to a transfer unit 1627 so that the developer adhered to the photoconductive drum 1625 is transferred to the recording sheet. The recording sheet to which the image data is transferred is carried to a fuser unit 1628, and heated and pressurized therein. Subsequently, the image data is fused to the recording sheet.

Where the image data is recorded on a single side of the recording sheet, the recording sheet that had passed through the fuser unit 1628 is discharged to a discharge unit 1614 by a discharge roller 1629. The discharge unit 1614 binds and sorts discharged recording sheets. Further, the discharge unit 1614 performs finishing processing such as stapling for the sorted recording sheets.

Further, where the image data is recorded on both sides of the recording sheet, the recording sheet is carried to the discharge roller 1629, and the rotation direction of the discharge roller 1629 is reversed, so that the recording sheet is led to a refed-sheet transmission passage 1631 by a flapper 1630. The recording sheet led to the refed-sheet transmission passage 1631 is transmitted to the transfer unit 1627 in the above-described manner.

Figure 18:
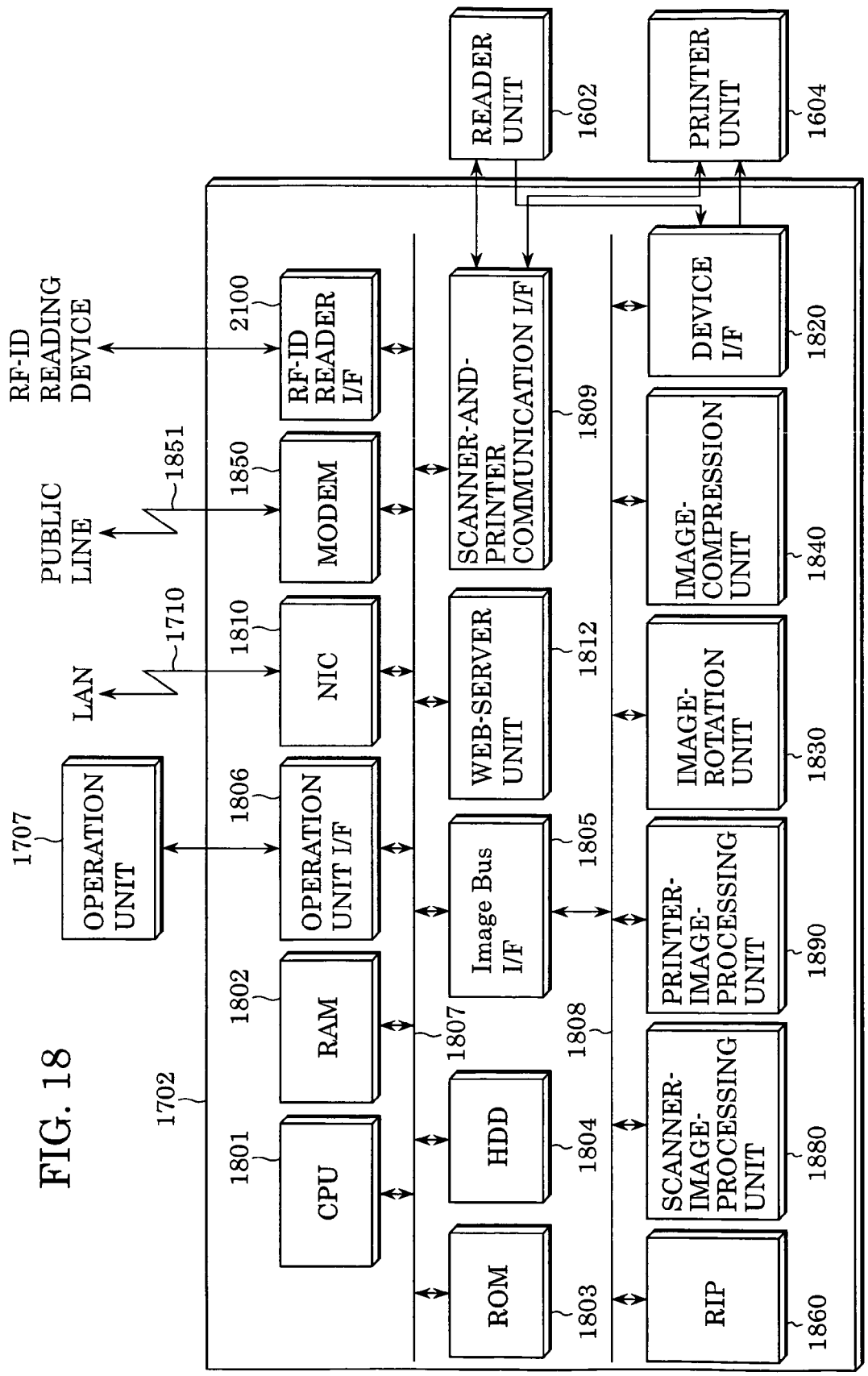
FIG. 18 is a hardware block diagram of a controller unit of the image-forming device according to the first embodiment of the present invention.

FIG. 18 is a block diagram illustrating the configuration of the controller unit 1702. The controller unit 1702 is connected to the reader unit 1602 functioning as an image-input device and the printer unit 1604 functioning as an image-output device. The controller unit 1702 is further connected to the LAN 1710 and a public line 1851 including a wide-area network (WAN), so as to input and output image information and/or device information. A central processor unit (CPU) 1801 is a controller that controls the entire system. A random access memory (RAM) 1802 is a system work memory necessary for the CPU 1801 operating and an image memory for temporarily storing image data. A read only memory (ROM) 1803 is a boot ROM storing a boot program of the system. A hard-disk drive (HDD) 1804 is a hard disk drive storing a system software, image data, and so forth. An operation-unit interface (I/F) 1806 is the interface between the controller unit 1702 and a user interface (UI) 1707. The operation-unit I/F 1806 transmits image data to the UI 1707 so that the display image of the image data is produced on the UI 1707. Further, the operation unit I/F 1806 transmits information inputted by a user through the UI 1707 to the CPU 1801. A network interface card (NIC) 1810 is connected to the LAN 1710, so as to input and output information. A modem 1850 is connected to the public line 1851, so as to input and output information. A scanner-and-printer-communication I/F 1809 is an interface for performing communications between the controller unit 1702 and a CPU (not shown) including the reader unit 1602 and the printer unit 1604. The above-described devices are arranged on a system bus 1807.

An image bus I/F 1805 is a bus bridge that connects the system bus 1807 to an image bus 1808 for transferring the image data with high speed, so as to convert the data configuration. The image bus 1808 includes a PCI bus, or an IEEE 1394. The following devices are arranged on the image bus 1808. A raster image processor (RIP) 1860 expands a page-description-language (PDL) code into a bit-map image. A device I/F 1820 connects the reader unit 1602, the printer unit 1604, and the controller unit 1702 to one another, so as to convert the image data between synchronous system and asynchronous system. A scanner-image processing unit 1880 performs modification, processing, and edits for image data transmitted thereto. A printer-image processing unit 1890 performs a corrective action for the printer, resolution conversion, and so forth for the data on an image transmitted from the printer. An image-rotation unit 1830 rotates the image data. An image-compression unit 1840 performs compression-and-extension processing for image data. That is to say, the image-compression unit 1840 uses the joint photographic experts group (JPEG) method for multilevel image data and the joint bi-level image experts group (JBIG) method, the modified-modified read (MMR) method, and the modified Huffman (MH) method for binary image data.

A Web-server unit 1812 functions, as a hyper-text transfer protocol (HTTP) server for presenting Web contents including a hyper-text markup language (HTML) file or the like stored in the HDD 1804 to a Web client. The Web-server unit 1812 may be provided in the controller unit 1702 as a free-standing hardware block. Otherwise, the same function as that of the Web-server unit 1812 may be achieved by storing software executing the Web-server function in the ROM 1803 and/or the HDD 1804, loading the software into the RAM 1802, and having the CPU 1801 execute the software.

Figure 1:
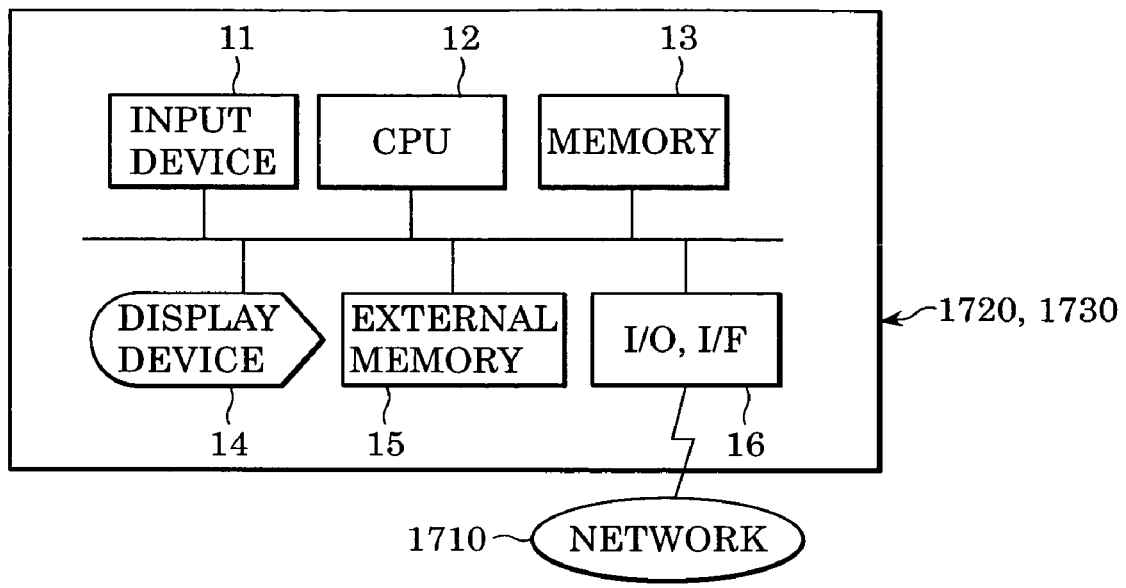
FIG. 1 is a block diagram of example hardware of a client of a form printing system.

FIG. 1 is a block diagram illustrating an example configuration of the hardware of each of the information-processing apparatuses, that is, the computers 1720 and 1730 shown in FIG. 17. Each of the computers 1720 and 1730 can be used for a form-printing system according to the embodiment of the present invention.

Each of the computers 1720 and 1730 is a computer system such as a personal computer (PC). The main part of the computer includes a central-processing unit (CPU) 12, a memory 13 including a RAM and/or a ROM functioning as a main memory, an external memory 15 including a floppy-disk (FD) drive, a hard-disk (HD) drive, and so forth, an input device 11 such as a keyboard, a mouse, and so forth, a display unit 14 including a cathode-ray-tube (CRT) display or the like, and an external input-and-output interface 16 connected to an external network or the LAN 1710. A Web browser, that will be described later, has its own software installed in the memory 13.

Each of the computers 1720 and 1730 operates, where the CPU 12 thereof executes a basic input/output (I/O) program, an operating system (OS), and a program. The basic I/O program is written into the memory 13 and the OS is written into the external memory 15. Further, when the power of each of the computers 1720 and 1730 is turned on, the OS is loaded from the external memory 15 into the memory 13 by the initial-program-loading (IPL) function of the basic I/O program, and the OS begins operating.

Figure 2:
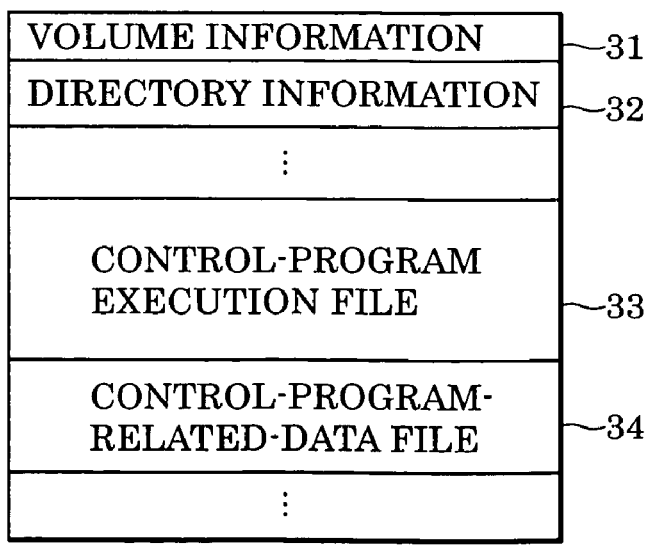
FIG. 2 shows the details of example data stored in a medium according to the present invention.

The program is program code generated based on a flowchart illustrating controlling steps shown in a drawing described below. According to this embodiment, the control program and related data are stored in an FD or the external memory 15. FIG. 2 shows a memory map 30 of the stored control program and related data. Volume information 31, directory information 32, control-program execution file 33 and control-program-related-data file 34 are stored in FD 15.

The control program and related data stored in the FD can be loaded into each of the computers 1720 and 1730 via the FD drive or the external memory 15, as shown in FIG. 1. Where the FD is inserted into the FD drive or the external memory 15, the control program and the related data are read from the FD drive or the external memory 15 under the control of the OS and the basic I/O program and loaded into the RAM or the memory 13, whereby the control program becomes operable.

Figure 3:
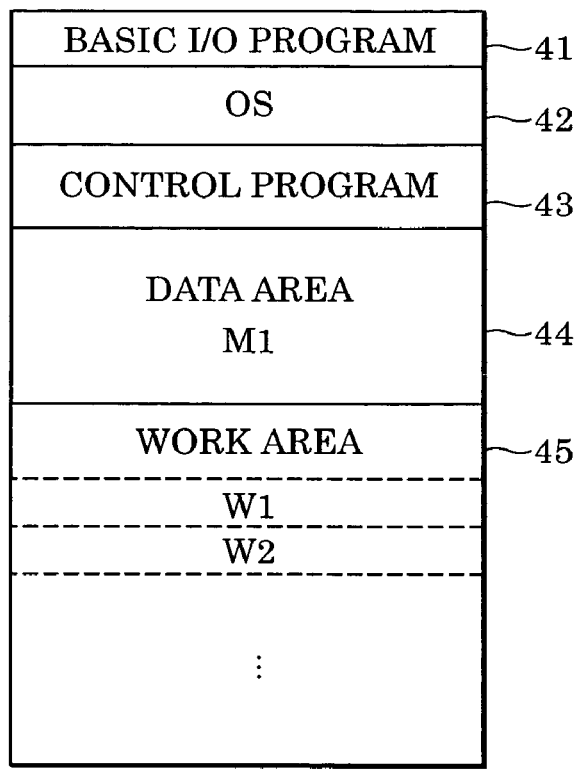
FIG. 3 shows an example configuration of a storage area of a control program, where the control program is operable.

FIG. 3 denotes a memory map 40 in the state where the control program is loaded into the RAM or the memory 13 and becomes operable. Basic program 41, operating System (OS) 42, control program 43, data area 44 and work area 45 are stored in RAM 13. According to this embodiment, the control program and/or the related data are directly loaded from the FD into the RAM or the memory 13 and executed. However, the control program and the related data may be stored in the HD or the external memory 15 and loaded into the RAM or the memory 13 from the HD or the external memory 15. Further, a medium storing the control program may be an optical disk, an IC-memory card, and so forth. Further, the control program may be stored in the ROM or the memory 13 so that the control program is directly executed by the CPU 12.

Next, the embodiment will be described in detail with reference to the attached drawings.

Figure 4:
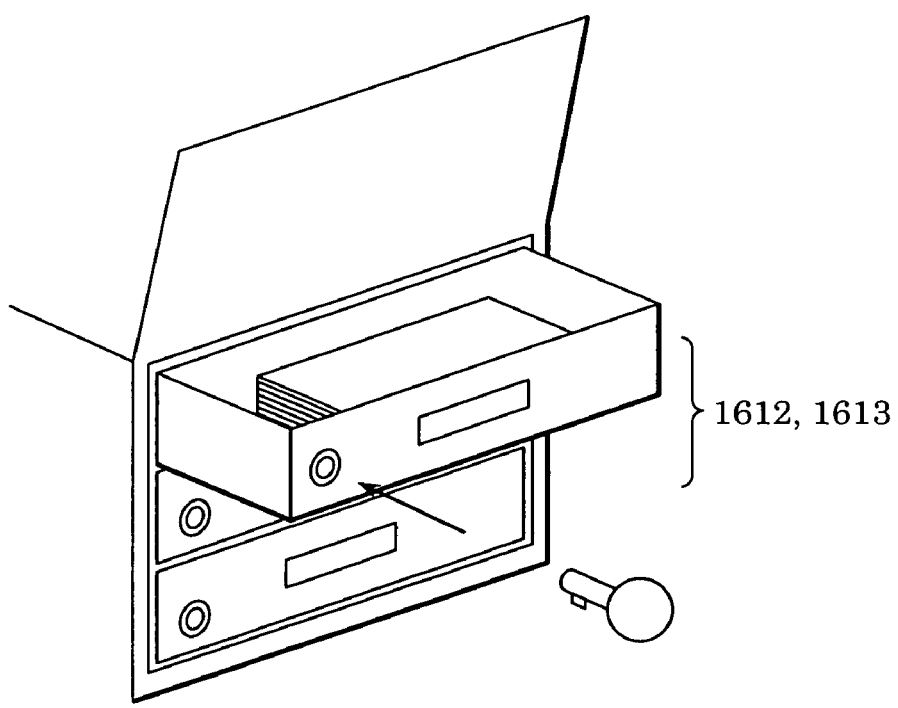
FIG. 4 shows an example print device according to a first embodiment of the present invention.

FIG. 4 shows part of each of the feeding cassettes 1612 and 1613 of the image-forming device 1600 shown in FIG. 16. According to this embodiment, each of the feeding cassettes 1612 and 1613 that are provided as sheet-feeding sources can be physically locked, as shown in FIG. 4. Anyone other than the person who maintains control of the key (hereinafter referred to as the "manager") associated with the locking mechanism of a particular feeding cassette cannot take a sheet out of the locked feeding cassette and add sheets. Addition of sheets is strictly controlled by the manager for management sake. The manager, also, manages the operation of the image-forming apparatus 1600 including fixing troubles such as paper jams.

The above-described configuration guards against the possibility that a special sheet can be physically taken out of each of the feeding cassettes 1612 and 1613 without any type of management control, and transmitted to the printing path via another feeding port of the image-forming device 1600. In addition, the above-described configuration also guards against use of another image-forming device, where the feeding port is permitted to be used by a predetermined user and/or predetermined software so that the special sheet that is printed is obtained through normal printing processing.

In the case of the image-forming device 1600 that can lock the feeding cassettes 1612 and 1613, the "manager" can directly set up a feeding-cassette configuration to the image-forming device 1500. At that time, where the feeding-cassette configuration is set up by using software that can communicate with the image-forming device 1600, the software may be a printer driver. Otherwise, a widely used Web browser including Internet Explorer®, Netscape®, and so forth may be used as the software, where the IP address of the image-forming device 1600 is specified and where the image-forming device 1600 can respond thereto and display a Web page. Of course, a special-purpose application for setting up configuration may be used.

Further, where the feeding-cassette configuration is set up by the image-forming device 1600, an operation panel 1707 of the image-forming device 1600 facilitates setting up the feeding-cassette configuration. However, if prime importance is placed on security, special-purpose hardware for setting up configuration may be provided separately from the image-forming device 1600. According to this embodiment, the Web browser of each of the computers 1720 and 1730 on a network or the LAN 1710 can set up the configuration to the image-forming device 1600.

FIG. 5 shows an image-setting page transmitted from the image-forming device 1600. The image-setting page is displayed by specifying an Internet protocol (IP) address assigned to the image-forming device 1600 by using the Web browser installed in either the computer 1720 or the computer 1730 and making an access to the Web-server unit 1812 of the image-forming device 1600. Where the image-forming device 1600 is introduced, the manager's password is determined, the password being necessary for changing the settings via the information-setting page. Here, a user operating the Web browser produces the display image of an information-setting screen 500 through the Web browser by using the password.

On the information-setting screen 500, a feeding-cassette-setting screen is opened on a page of the Web browser, so as to set a name for each of the feeding cassettes. Reference number 502 denotes a box for showing the uniform resource location (URL) of the Web server of the image-forming device 1600. Where a checkbox 506 reading "ENCRYPTION" is marked, as shown in this drawing, and a setting button 508 is selected, the detailed data of the settings shown on the information-setting screen 500 is transmitted to the Web server of the image-forming device 1600. The controller unit 1702 encrypts and stores the character string of a cassette name corresponding to the marked checkbox 506 reading "ENCRYPTION" in the HDD 1804 of the image-forming device 1600. In an example shown in FIG. 6, "WATER- MARKED SHEET A" is encrypted and stored in the HDD 1804. According to this embodiment, encryption is performed according to a known common-key encryption method such as the data encryption standard (DES), the triple DES, and the advanced encryption standard (AES), and so forth by using a common key in the possession of the image-forming device 1600. However, other encryption methods may be used. On the other hand, where the name "OHP sheet" is set for a feeding cassette 2 and the checkbox reading "ENCRYPTION" corresponding thereto is not marked, the character string "OHP SHEET" is not encrypted and stored in the HDD 1804.

In general, a printer driver is installed on each of the computers 1720 and 1730, and the information of the image-forming device 1600 is obtained by communications, and setting information set on the information-setting screen 500 of the Web browser is obtained by the printer driver of each of the computers 1720 and 1730 for use. However, the encrypted cassette name remains encrypted, even though the printer driver requests information. Subsequently, the encrypted cassette is determined to be a cassette that cannot be used through the printer driver. Otherwise, the controller unit 1702 may not inform a computer that has not logged on in a manner that will be described later of the encrypted cassette name. Usually, a sheet cassette that cannot be identified by a printer driver cannot be used by widely used software.

As has been described, where a feeding cassette is locked, it becomes possible to physically prevent a predetermined sheet from being obtained and used. Further, it becomes possible to prevent the predetermined sheet in the locked feeding cassette from being specified and fed through software. Subsequently, it becomes possible to prevent the predetermined sheet from being used for printing by widely used software.

Next, a method for using a sheet cassette on which use restriction is placed through predetermined software will be described. Here, an example of form-printing software for superimposing and overlaying a form and field data that is installed in the computers 1720 and 1730 so as to print the form and the field data for obtaining a finished printed form will be described. The functions used for form printing are known.

The form-printing software generates a form including information about rule, information about the position on which the field data is printed, and so forth. In the course of generation, where a predetermined form is printed, sheet information for informing the user that a sheet is fed from a predetermined feeding cassette of the image-forming device 1600 is shown in the form. The above-described technology is already known.

By using the above-described technology, a method for specifying a predetermined feeding cassette on which use restriction is placed for generating the form is provided. Subsequently, it becomes possible to use the above-described feeding cassette only through predetermined software or the form printing software in place of the printer driver. Subsequently, a secure system including an image-forming device and software can be provided.

The details of processing performed by the form printing software will be described with reference to the attached drawings.

First, the flow of processing performed for generating form data will be described. FIG. 6 shows a setting screen produced by the form printing software for generating a predetermined form. The setting screen is used for determining which feeding cassette of the image-forming device 1600 should be used for feeding a sheet on which the predetermined form is to be printed. The above-described form printing software is already known. Usually, feeding-cassette names shown on the setting screen 600 are provided, as the list of feeding cassettes that can be used through software programs of every description.

However, according to the present invention, where a button 602 reading "LOG IN TO PRINTER" on the setting screen 600 is selected, an image-forming-device selection screen is shown, as in FIG. 7. Then, a user can log in to a selected printer as a user with management authority or a predetermined authority.

Figure 8:
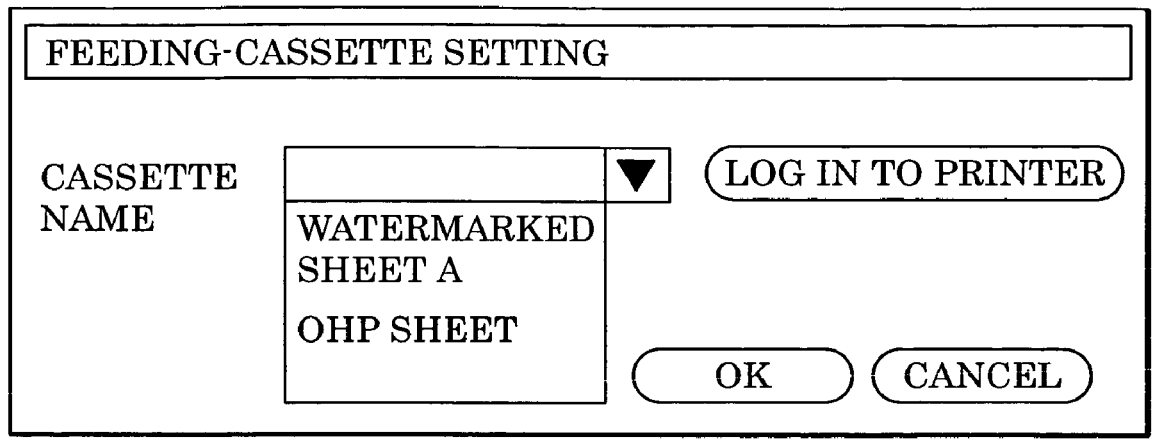
FIG. 8 shows an example feeding-cassette setting screen according to the first embodiment of the present invention, where the feeding-cassette setting screen is provided for performing printing for the form.

When a user logs in to the printer in the above-described manner, the same result as that of the case where the user logs in to the above-described information-setting screen 500 shown in FIG. 5 is obtained. From this point, encrypted communications can be carried out between the image-forming device 1600 and the computers to which the user logs in by using the secure sockets layer (SSL), the secure shell (SSH), and so forth. Once the user logs in to the computer, the user can acquire an encrypted cassette name held in the image-forming device 1600. Further, the user can acquire a cassette name decoded by the image-forming device 1600. Subsequently, it becomes possible to acquire the cassette name decoded by the image-forming device 1600 and produce a display image of the decoded cassette name on the screen, as shown in FIG. 8. On the other hand, it becomes possible to acquire the cassette name that remains encrypted and hold the value of the encrypted cassette name in form data, as a set value. Here, a flag is added to the cassette name stored in the form data, so as to show that the cassette name is encrypted. In this state, the form data is stored, as a file.

Next, the flow of print processing performed by the form printing software will be described with reference to a flowchart shown in FIG. 10.

In this drawing, a form printing application and a printer driver are installed on each of the computers 1720 and 1730. On the other hand, processing procedures performed by the image-forming device 1600 shown in this drawing are carried out by the CPU 1801 of the controller unit 1702.

The form printing software overlays the form and the field data on each other through known overlay processing by using the form-data file stored in the above-described generation processing and performs overlay printing.

Figure 9:
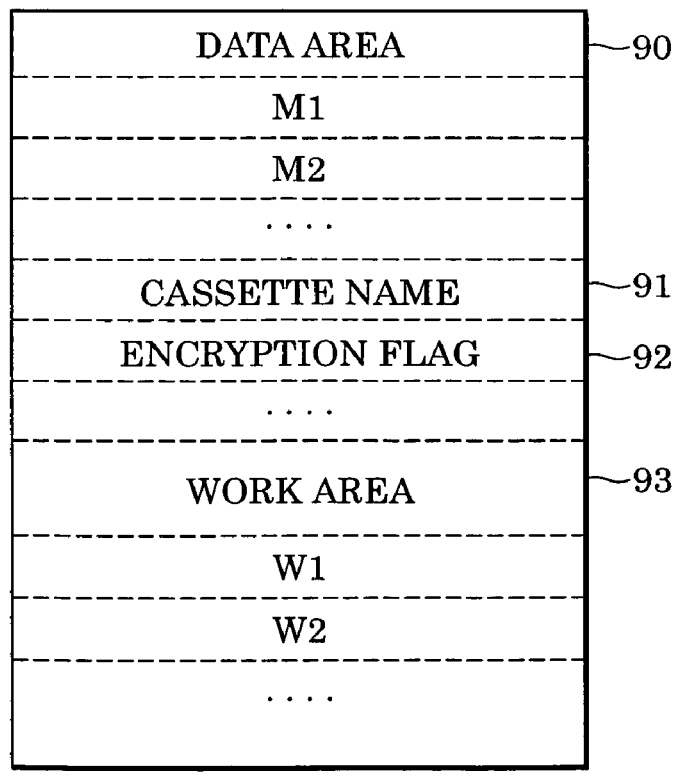
FIG. 9 shows an example storage area according to the first embodiment of the present invention, where the storage area is used for performing printing for the form.

FIG. 9 shows the state where the form printing software opens the form-data file and maps information in the form-data file onto the memory 13. Data area 90, cassette name 91, encryption flag 92 and work area 93 are stored in memory 13. Returning to FIG. 10, the form printing software determines whether feeding-cassette specification was made before it starts drawing (step S1001). Where the feeding-cassette specification was not made in an area 91 on the memory 13, an instruction to make feeding-cassette specification is not issued and the remaining printing processing is continued (step S1015).

Where the feeding-cassette specification was made, it is determined whether the cassette name corresponding to the specified feeding cassette is encrypted by taking a flag out of an area 92 on the memory 13 (step S1002). Where it is determined that the cassette name is not encrypted, the character string corresponding to the cassette name is taken out of the area 91, so that the cassette name is set to a system that interfaces with the image-forming device 1600 as a feeding-source cassette, where, for example, the system includes the printer driver (step S1014). Then, the remaining printing processing is continued (step S1015).

Where it is determined that the cassette name is encrypted, the encrypted string corresponding to the cassette name is taken out of the area 91, and the form printing software sets the encryption mode to the printer driver under a predetermined protocol (step S1003/step S1004).

Where the cassette name is transmitted to the printer driver, as the encrypted string, the printer driver immediately transmits the encrypted string to the image-forming device 1600 (step S1005). Upon receiving the encrypted string, the image-forming device 1600 decrypts the encrypted string, so as to confirm whether the transmitted encrypted string is information that is encrypted in a manner suitable for the image-forming device 1600 (step S1006).

Where the image-forming device 1600 determines that the encrypted string transmitted from the printer driver is valid, at step S1006, the image-forming device 1600 takes the feeding-cassette name out of the decrypted encrypted string, and confirms that the feeding-cassette name is a name that had been set for any one of its own feeding cassettes (step S1007).

Then, where the feeding-cassette name agrees with any one of its own feeding cassettes, the image-forming device 1600 internally switches to the corresponding feeding cassette and sets itself to a state for receiving subsequent print data (step S1008). In step s1007, if the feeding-cassette name doesn't agree with any one of its own feeding cassettes, it is determined that error is occurred and advances to step s1010. The transmitted print data is printed on a sheet fed from the switched sheet cassette. After that, the image-forming device 1600 transmits information indicating that no error has occurred to the printer driver (step S1009). The printer driver directly transmits the information transmitted from the image-forming device 1600 to the form printing software.

Where it is determined in step S1006 that the encrypted string transmitted from the printer driver is not valid, the image-forming device 1600 transmits error information to the printer driver. The printer driver directly transmits the error information transmitted from the image-forming device to the form printing software. After the processing returns, the form printing software cancels the encryption mode (steps S1011/1012).

Upon receiving the information indicating that no error has occurred in the image-forming device 1600 via the printer driver ("no" at step s1013), the form printing software advances to the printing processing (step S1015). On the other hand, the printing processing is stopped at the time (step s1016) where the form printing software receives error information transmitted from the image-forming device 1600 via the printer driver ("yes" at step S1013). After that, the form printing software advances to subsequent processing (step S1017).

Thus, the form printing software can specify a sheet cassette and inform the image-forming device 1600 of information about the specified sheet cassette at the printing time by using the encrypted string that is acquired from the image-forming device 1600 at the time where the form data is generated. Subsequently, if the user does not have the management authority and/or the predetermined authority when the form data is generated, the user cannot specify a predetermined sheet cassette as a feeding port. However, where the printing is performed, an encrypted sheet-cassette name is transmitted, to the image-forming device 1600 so that the image-forming device 1600 determines the validity of the sheet-cassette name. The user can use the form-data file for printing, even though the user does not have the management authority. That is to say, where an ordinary user's form is used, printing can be performed without any problems.

However, where the details of encrypted cassette-name string stored in the form-data file are known due to release of the file-format or the like, a malicious user may counterfeit the form-data file.

Therefore, the above-described form printing software may be used in combination with protection against falsification. For example, an electronic signature may be placed on a generated form-data file.

Second Embodiment

Figure 11:
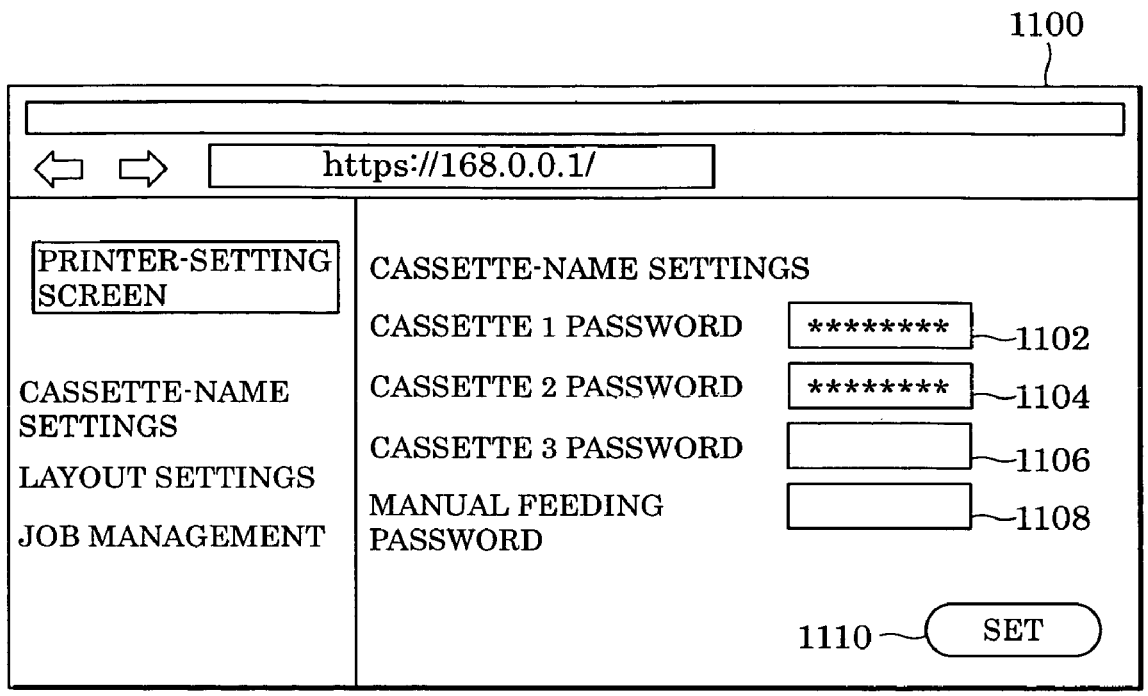
FIG. 11 shows an example information-setting page of an image-forming device according to a second embodiment of the present invention.

FIG. 11 shows an example of the display image of another information-setting page transmitted from the image-forming device 1600 by using the Web browser installed in each of the computers 1720 and 1730. Where the image-forming device 1600 is introduced, the "manager's" password is determined, the password being necessary for changing the settings via the information-setting page. Here, the user sees an information-setting screen 1100 of the image-forming device 1600 by using the "manager's" password. That is to say, the user cannot access the information-setting screen 1100 without the management authority.

The information-setting screen 1100 is opened on a page of the Web browser, so as to set a password for each of the feeding cassettes. Password-setting boxes 1102, 1104, 1106, and 1108 are used for setting the password for each of the feeding cassettes. When a set button 1110 is selected, the details of settings made by the Web browser are transmitted to the Web-server unit 1812 and stored in the HDD 1804 of the controller-unit 1702. For setting a password on the information-setting screen 1100, encrypted communications, including the above-described SSL, or SSH, are typically performed between the Web browser of each of the computers 1720 and 1730 and the Web-server unit 1812. The flow of processing procedures performed by the above-described image-forming device 1600 is described below.

First, the flow of processing procedures performed for generating the form data is shown.

Figure 12:
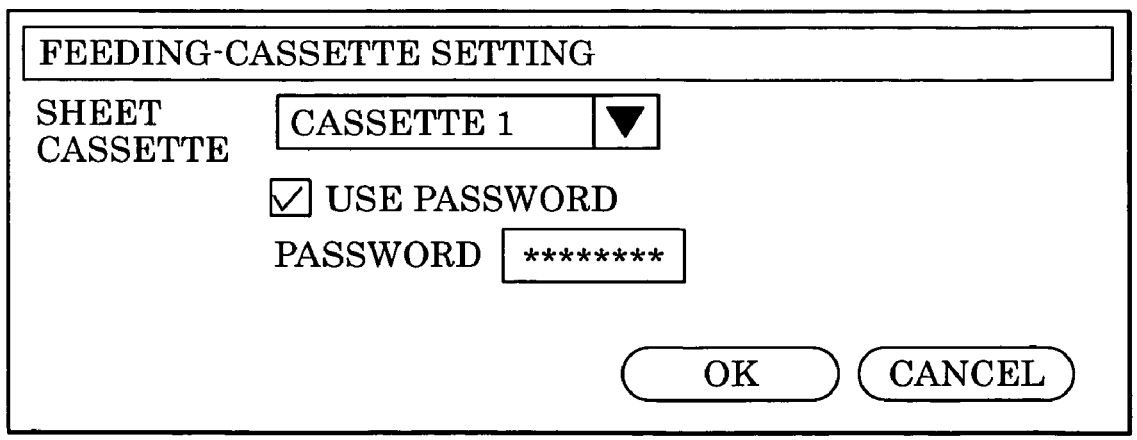
FIG. 12 shows an example feeding-cassette setting screen according to the second embodiment of the present invention, where the feeding-cassette setting screen is provided for performing printing for the form.

FIG. 12 shows a setting screen produced by the form printing software for generating a predetermined form. The setting screen is used for determining which feeding cassette of the image-forming device 1600 should be used for feeding a sheet on which the predetermined form is to be printed. Unlike the first embodiment, the setting screen of FIG. 12 shows a list of the entire feeding cassettes of the image-forming device 1600 via a drop-down menu.

Where the designer of the form determines that a password is required for a predetermined feeding cassette, the password is supplied by marking a password box.

At this stage, communications with the image-forming device 1600, such as the log-in in the first embodiment, is not necessarily performed, since the form designer only has to know information for uniquely specifying a predetermined feeding cassette and the password corresponding thereto. A password supplied at this time is encrypted by the form printing application. Then, the encrypted password is embedded and stored in a form-data file. Here, the password is encrypted according to a known common-key encryption method, such as the above-described DES, TribleDES, AES, and so forth by using a common key the computers 1720 and 1730 can obtain. However, the password may be encrypted by any another encryption method.

Next, the flow of print processing performed by the form printing software will be described with reference to FIG. 14.

Figure 10:
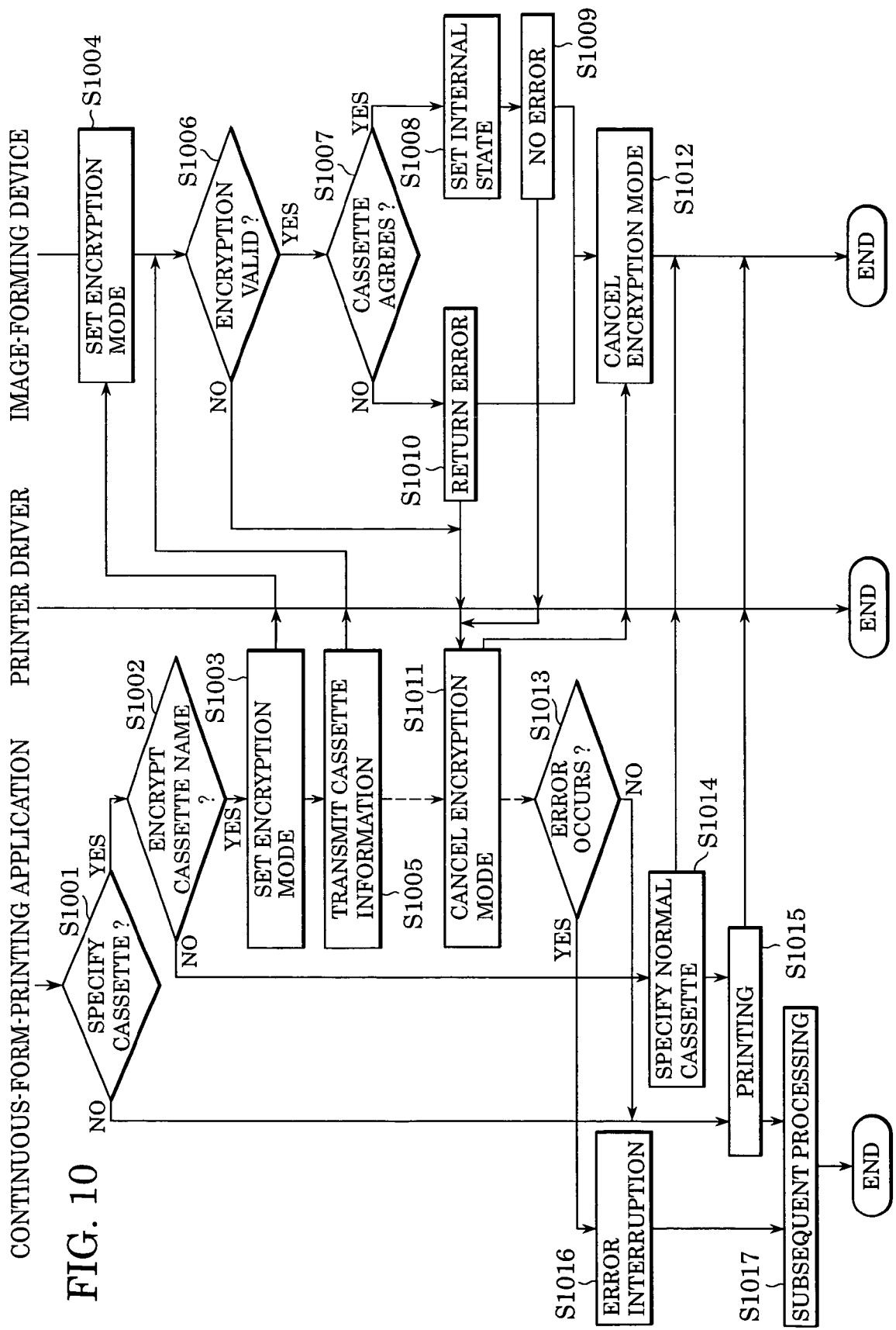
FIG. 10 is a flowchart showing example processing procedures performed for printing according to the first embodiment of the present invention.

In this drawing, a form printing application and a printer driver are installed on each of the computers 1720 and 1730, as is the case with FIG. 10. Processing procedures performed in the image-forming device 1600 shown in FIG. 14 are carried out by the CPU 1801 of the controller unit 1702.

Figure 13:
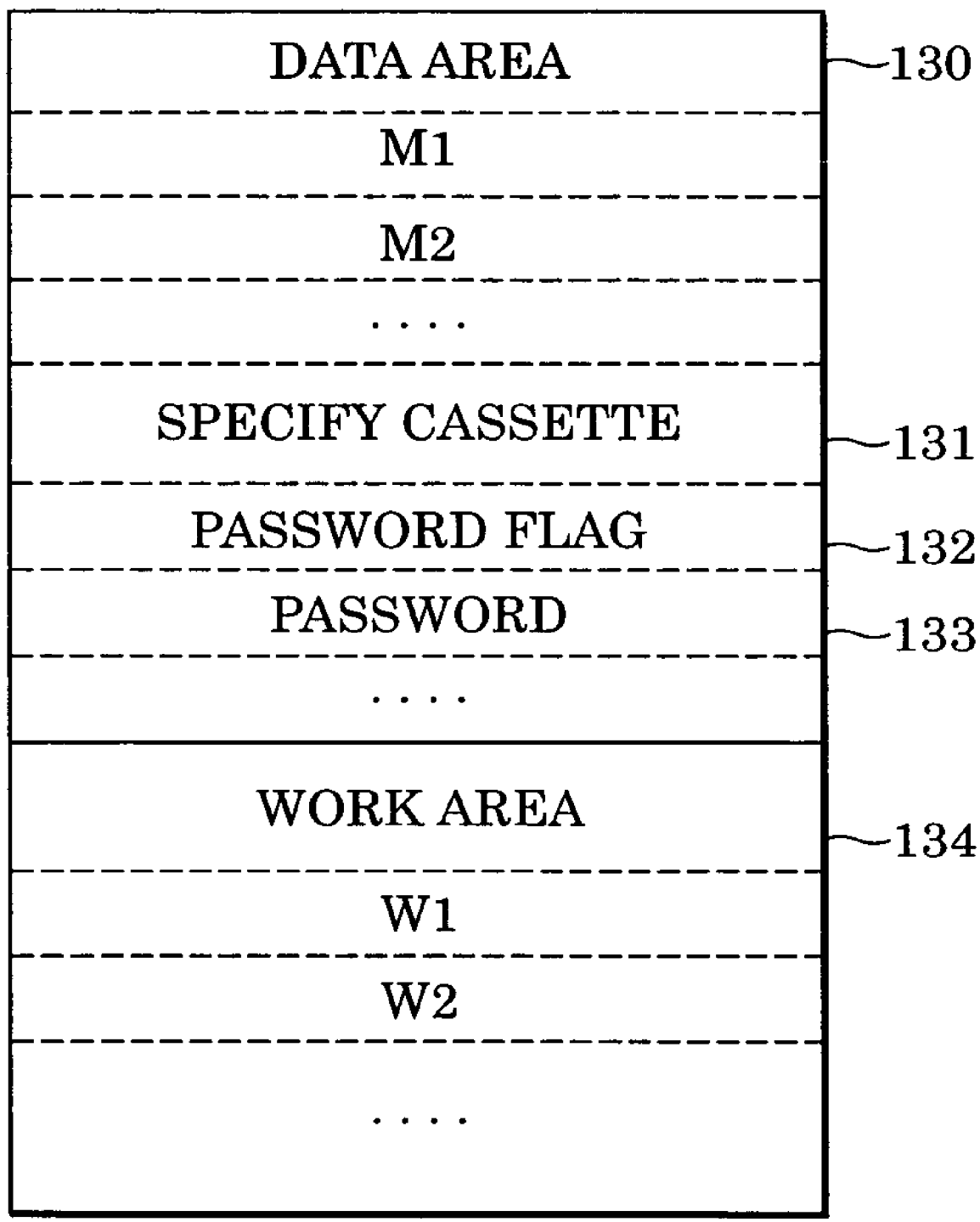
FIG. 13 shows an example storage area according to the second embodiment of the present invention, where the storage area is used for performing printing for the form.

The form-data file stored in the above-described generation procedures is opened and mapped on the memory 13, as shown in FIG. 13. Data area 130, specify cassette 131, password flag 132, password 133 and work area 134 are stored in memory 13. Returning to FIG. 14, it is first determined whether or feeding-cassette specification was made for performing printing processing (step S1401). If the feeding-cassette specification was not made, an instruction to make feeding-cassette specification is not issued and the remaining printing processing is continued (step S1413).

If the feeding-cassette specification was made, information about the feeding-cassette specification is taken out of an area 131 on the memory 13, so that the cassette name is set to a system that interfaces with the image-forming device 1600 as a feeding-source cassette. The system includes, for example, the printer driver (step S1402).

The image-forming device 1600 determines whether the specified feeding cassette requires a password (step S1403). When the specified feeding cassette requires the password, the image-forming device 1600 transmits a request for the password to the printer driver (step S1404). This request is directly transmitted to the form printing application.

If it is determined that the cassette name and the password are specified (step S1405), the form printing application takes the encrypted password string out of an area 133 on the memory 13. That is to say, the encrypted password string embedded in the form data file is taken out. Then, the encrypted password is decrypted and the cassette name is transmitted to the image-forming device 1600 via the printer driver (step S1406). Where no password is specified, it is determined that an error has occurred, and the print processing is stopped (step S1412). In the case where the password string is transmitted in plain text, the password information may be intercepted. Therefore, encrypted communications, including the above-described SSL and SSH, are typically performed between each of the computers 1720 and 1730 and the image-forming device 1600.

Upon receiving the password, at step S1406, the image-forming device 1600 determines whether the password agrees with a password that had been set for the specified feeding cassette (step S1407). If it is determined that the password is valid, the image-information device 1600 sets its own internal state and switches to the feeding cassette or feeding port corresponding to the valid password (step S1408). Then, it is determined that no error has occurred (step S1409) and the processing proceeds to step S1411. If, in step S1407, it is determined that the password is invalid, error information is transmitted (step S1410) and the process proceeds to step S1411.

In step S1411, if it is determined that no error has occurred, the form printing software advances to print processing (step S1413). If, in step S1411, it is determined that an error has occurred, an error interruption occurs (step S1412). Following steps S1412 or S1413, subsequent processing that had been set is performed (step S1414).

According to the above-described embodiment, feeding-cassette specification is not necessarily performed by using the name of a concerned sheet cassette. For example, a simpler parameter such as the identification number of the concerned sheet cassette may be used.

Thus, the above-described embodiment is achieved by using a simple password. Since cassette names and a complex system wherein the image-forming device 1600 encrypts the cassette names or the like may not be used, implementation of software and hardware is facilitated.

Third Embodiment

According to the above-described second embodiment, a password provided for the predetermined sheet cassette is embedded in a form-data file so that the user who wants a printed form does not have to supply the password. However, the user may be asked to supply the password every time form printing is performed.

Figure 14:
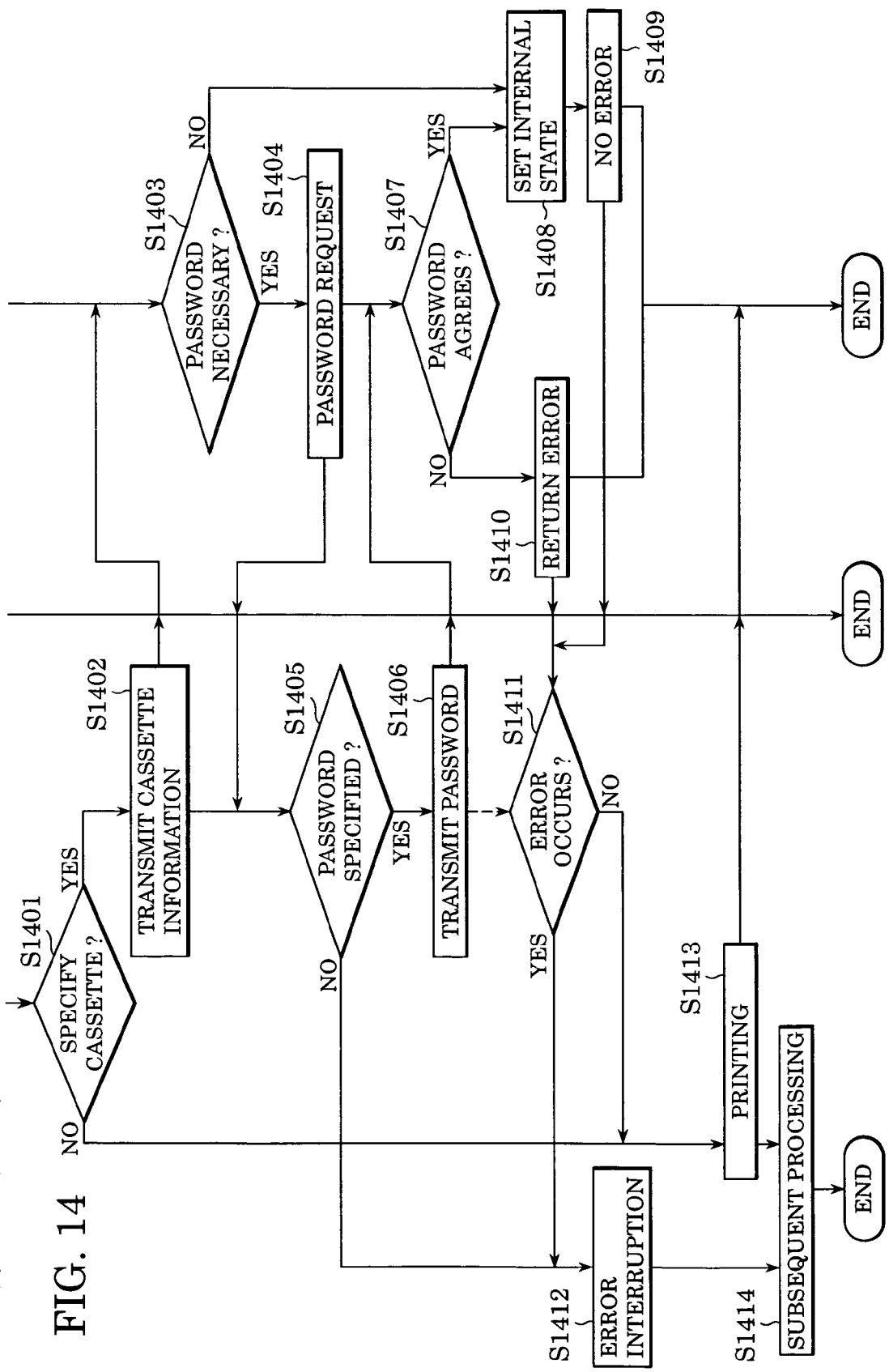
FIG. 14 is a flowchart showing example processing procedures performed for printing according to the second embodiment of the present invention.
Figure 15:
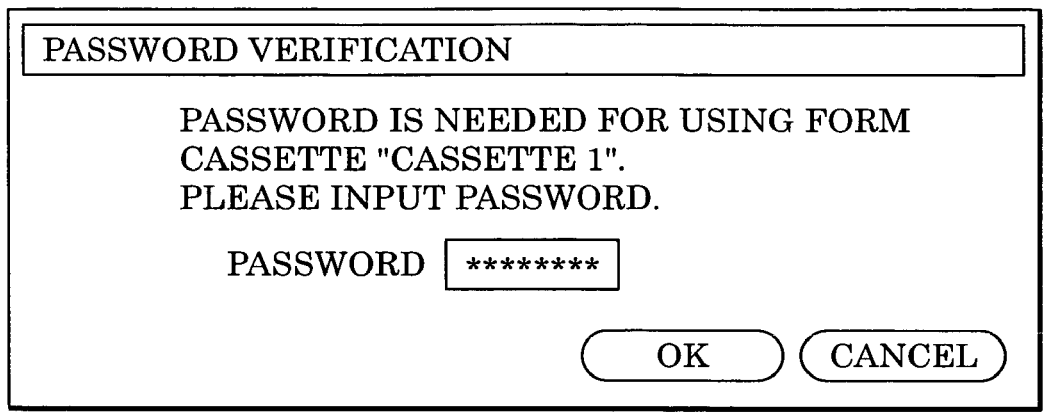
FIG. 15 shows an example password-supplying screen used for printing according to a third embodiment of the present invention.

When the form printing is performed, a screen shown in FIG. 15 is produced at step S1406 of FIG. 14, where the user supplies the password. The supplied password is transmitted to the image-forming device 1600 via the printer driver. Thus, the supplied password is transmitted to the image-forming device 1600 through the same path as that of the second embodiment.

Even though the user obtains the form-data file, the user cannot perform printing, unless the user obtains the necessary password. Therefore, for a user in possession of the password of each of the sheet cassettes, the above-described embodiment allows the user to perform printing with higher security than a user without access to the passwords.

Other Embodiments

It is to be understood that the present invention can also be achieved by supplying program code of software for implementing functions of the above-described embodiments to a computer (CPU, MPU, etc.) of an apparatus or system connected to the above-described various devices so that the devices are made to operate for implementing the functions of the above-described embodiments and making the above-described devices operate according to the program stored in the computer of the system or the apparatus.

In that case, the program code itself achieves the functions of the above-described embodiments. Therefore, the program code itself and means for transmitting the program code to the computer, that is, a recording medium storing the program code constitute the present invention. The recording medium for recording the above-described program code may be, for example, a floppy disk, a hard disk, an optical disk, a magnet-optical disk, a CD-ROM, a magnetic tape, a non-volatile memory card, a ROM, and so forth.

Furthermore, not only by the computer executing the transmitted program code, but also by an operating system (OS) running on the computer, or a combination of the OS and other application software or the like, the functions of the above-described embodiments may be achieved. In that case, the program code is included in the embodiments of the present invention.

In another embodiment of the present invention, the transmitted program code is stored in a memory of a function extension board inserted in the computer or a function extension unit connected to the computer. Then, a CPU or the like of the function extension board or the function extension unit executes part of or the entire process according to an instruction of the program code, whereby the functions of the above-described embodiments are achieved.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170227 filed Jun. 8, 2004, and Japanese Patent Application No. 2005-148537 filed May 20, 2005, which are hereby incorporated by reference herein.

What is claimed is:

1. An image-forming device comprising:
   a plurality of sheet feeding units;
   an image forming unit configured to perform an image forming process on a sheet fed from any of the plurality of sheet feeding units;
   a setting-information storing unit configured to store setting information concerning the plurality of sheet feeding units, wherein the setting information includes a plurality of restriction-setting items corresponding to the plurality of sheet feeding units, which indicates whether or not to restrict feeding of a sheet from a sheet feeding unit;
   a specifying-information storing unit configured to store a plurality of specifying information for specifying each of the plurality of sheet feeding units, wherein specifying information among the plurality of specifying information, which corresponds to the sheet feeding unit in which the feeding of sheet is restricted based on the setting information stored in the setting-information storing unit, is encrypted;
   a transmitting unit configured to transmit the plurality of specifying information stored in the specifying-information storing unit, to an information processing apparatus which is capable of communicating with the image-forming device;
   a receiving unit configured to receive the specifying information specifying one of the plurality of sheet feeding units, from the information processing apparatus;
   a determination unit configured to determine whether use of the sheet feeding unit specified by the specifying information is restricted, based on a restriction-setting item corresponding to the specified sheet feeding unit;
   a cancel unit configured to cancel the restriction of the use of the sheet feeding unit specified by the specifying information if the specifying information received by the receiving unit is encrypted and the encrypted specifying information is valid, even if the determination unit determines that the use of the sheet feeding unit specified by the specifying information is restricted;
   an authenticating unit configured to authenticate a user of the image-forming device; and
   a changing unit configured to change contents of the setting information,
   wherein in a case where the authenticating unit authenticates the user, the changing unit changes contents of the restriction-setting item included in the setting information based on an instruction from the user.

2. An image-forming device according to claim 1, wherein the changing unit changes the contents of the setting information based on the instruction which is transmitted from an external apparatus operated by the user who is authenticated by the authenticating unit.

3. An image-forming device according to claim 1, further comprising:
   a locking unit configured to physically lock at least one of the plurality of sheet feeding units.

4. A method for controlling an image-forming device including a plurality of sheet feeding units and an image forming unit configured to perform an image forming process on a sheet fed from any of the plurality of sheet feeding units, the method comprising:
   storing setting information concerning the plurality of sheet feeding units, wherein the setting information includes a plurality of restriction-setting items corresponding to the plurality of sheet feeding units, which indicates whether or not to restrict feeding of a sheet from a sheet feeding unit;
   storing a plurality of specifying information for specifying each of the plurality of sheet feeding units, wherein specifying information among the plurality of specifying information, which corresponds to the sheet feeding unit in which the feeding of sheet is restricted based on the setting information stored in a setting-information storing unit, is encrypted;
   transmitting the plurality of specifying information stored in the specifying-information storing unit, to an information processing apparatus which is capable of communicating with the image-forming device;
   authenticating a user of the image-forming device;
   changing contents of the setting information based on an instruction from the user, in a case where the user is authenticated;
   receiving the specifying information specifying one of the plurality of sheet feeding units, from an information processing apparatus;
   determining whether use of the sheet feeding unit specified by the specifying information is restricted based on a restriction-setting item corresponding to the specified sheet feeding unit; and
   canceling the restriction of the use of the sheet feeding unit specified by the specifying information if the specifying information received by a receiving unit is encrypted and the encrypted specifying information is valid, even if it is determined that the use of the sheet feeding unit specified by the specifying information is restricted.

5. A non-transitory computer-readable storage medium storing a computer program for causing a computer to execute a method for controlling an image-forming device including a plurality of sheet feeding units and an image forming unit configured to perform an image forming process on a sheet fed from any of the plurality of sheet feeding units, the method comprising:
   storing setting information concerning the plurality of sheet feeding units, wherein the setting information includes a plurality of restriction-setting items corresponding to the plurality of sheet feeding units, which indicates whether or not to restrict feeding of a sheet from a sheet feeding unit;
   storing a plurality of specifying information for specifying each of the plurality of sheet feeding units, wherein specifying information among the plurality of specifying information, which corresponds to the sheet feeding unit in which the feeding of sheet is restricted based on the setting information stored in a setting-information storing unit, is encrypted;
   transmitting the plurality of specifying information stored in the specifying-information storing unit, to an information processing apparatus which is capable of communicating with the image-forming device;
   authenticating a user of the image-forming device;
   changing contents of the setting information based on an instruction from the user, in a case where the user is authenticated;

receiving the specifying information specifying one of the plurality of sheet feeding units, from an information processing apparatus;

determining whether use of the sheet feeding unit specified by the specifying information is restricted based on a restriction-setting item corresponding to the specified sheet feeding unit; and canceling the restriction of the use of the sheet feeding unit specified by the specifying information if the specifying information received by a receiving unit is encrypted and the encrypted specifying information is valid, even if it is determined that the use of the sheet feeding unit specified by the specifying information is restricted.

* * * * *